United States Patent
Wang

(10) Patent No.: US 8,824,408 B2
(45) Date of Patent: Sep. 2, 2014

(54) METHOD OF HANDLING RANDOM ACCESS PROCEDURE ASSOCIATED TO CELL DEACTIVATION

(75) Inventor: Chun-Yen Wang, Tainan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 51 days.

(21) Appl. No.: 13/568,119

(22) Filed: Aug. 6, 2012

(65) Prior Publication Data

US 2013/0039294 A1 Feb. 14, 2013

Related U.S. Application Data

(60) Provisional application No. 61/522,255, filed on Aug. 11, 2011.

(51) Int. Cl.
*H04W 4/00* (2009.01)

(52) U.S. Cl.
USPC .......................... 370/329; 709/207

(58) Field of Classification Search
USPC .......................... 709/207; 370/329
See application file for complete search history.

(56) References Cited

U.S. PATENT DOCUMENTS

| | | | | |
|---|---|---|---|---|
| 2010/0322173 A1* | 12/2010 | Marinier et al. | ............... | 370/329 |
| 2011/0134774 A1* | 6/2011 | Pelletier et al. | ............... | 370/252 |
| 2011/0269490 A1* | 11/2011 | Earnshaw et al. | ............. | 455/509 |
| 2012/0008600 A1 | 1/2012 | Marinier | | |
| 2012/0082107 A1* | 4/2012 | Ou et al. | ....................... | 370/329 |
| 2012/0093073 A1 | 4/2012 | Lunttila | | |
| 2012/0113827 A1* | 5/2012 | Yamada et al. | ............... | 370/252 |
| 2012/0113831 A1 | 5/2012 | Pelletier | | |
| 2012/0207109 A1 | 8/2012 | Pajukoski | | |
| 2012/0327821 A1 | 12/2012 | Lin | | |
| 2013/0114554 A1 | 5/2013 | Yang | | |
| 2013/0121299 A1 | 5/2013 | Kim | | |
| 2013/0250822 A1 | 9/2013 | Yang | | |
| 2013/0322307 A1 | 12/2013 | Yang | | |
| 2014/0003392 A1 | 1/2014 | Yang | | |

FOREIGN PATENT DOCUMENTS

| | | |
|---|---|---|
| JP | 2013511916 A | 4/2013 |
| WO | 2010148319 A1 | 12/2010 |
| WO | 2011063244 A2 | 5/2011 |

OTHER PUBLICATIONS

CMCC, DL and UL linking in CA, 3GPP TSG-RAN WG2 Meeting #69bis, R2-102423, Apr. 12-16, 2010, pp. 1-5, XP050422675, Beijing, P. R. China.
Ericsson et al, Random Access Failure Handling on SCell, 3GPP TSG-RAN WG2 #77, TDOC R2-120482, Feb. 6-10, 2012, pp. 1-3, XP050565411, Dresden, Germany.
Nokia Siemens Networks, Nokia Corporation, Cell specific TDD configuration with inter-band CA, 3GPP TSG-RAN WG2 Meeting #74, R2-112946, May 9-13, 2011, XP050495304, Barcelona, Spain.
Intel Corporation, Support of Mixed Inter-Band TDD Configurations in Rel-11 CA, 3GPP TSG RAN2#74 meeting, R2-113216, May 9-13, 2011, pp. 1-3, XP050495383, Barcelona, Spain.
Renesas Mobile Europe, Operation Principles of CC specific TDD Configuration, 3GPP TSG-RAN WG2 Meeting #74, R2-112938, May 9-13, 2011, XP050495150, Barcelona.

* cited by examiner

*Primary Examiner* — Kenny Lin
(74) *Attorney, Agent, or Firm* — Winston Hsu; Scott Margo

(57) ABSTRACT

A method of handling random access procedure associated to cell deactivation for a mobile device in a wireless communication system is disclosed. The method comprises activating a secondary cell configured by a network of the wireless communication system, performing a random access procedure for the activated secondary cell, and when the secondary cell is deactivated during the random access procedure, continuously performing the random access procedure.

17 Claims, 9 Drawing Sheets

METHOD OF HANDLING RANDOM ACCESS PROCEDURE ASSOCIATED TO CELL DEACTIVATION

CROSS REFERENCE TO RELATED APPLICATIONS

This application claims the benefit of U.S. Provisional Application No. 61/522,255, filed on Aug. 11, 2011 and entitled "Methods and System of Uplink Control Information Feedbacks for Carrier Aggregation", the contents of which are incorporated herein in their entirety.

BACKGROUND OF THE INVENTION

1. Field of the Invention

The application relates to a method utilized in a wireless communication system, and more particularly, to a method of handling random access procedure associated to cell deactivation in a wireless communication system.

2. Description of the Prior Art

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and transmitting. In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as a primary cell (PCell). In the downlink, the component carrier corresponding to the PCell is the Downlink Primary Component Carrier (DL PCC) while in the uplink it is the Uplink Primary Component Carrier (UL PCC). In addition, cells other than the PCell are named secondary cell (SCell).

Note that, the PCell (i.e. the UL and DL PCC) is always activated, whereas the SCell may be activated or deactivated according to specific conditions (e.g. an amount of data for transmission). When a SCell is deactivated, the UE shall not monitor the physical downlink control channel (PDCCH) of the SCell and shall not receive any downlink assignments or uplink grants associated to the SCell. Besides, the UE shall not transmit on UL-SCH on the SCell and not transmit SRS on the SCell. In addition, the network activates and deactivates the SCell by sending the Activation/Deactivation command. The UE starts a deactivation timer for the SCell when the SCell is activated, wherein the SCell is deactivated when the deactivation timer expires.

According to the prior art, it is possible to configure a UE of a PCell and one SCell or more SCells. Therefore, multiple timing alignments, each for synchronization with a serving base station on uplink timing for preventing signals transmitted from the UE from colliding with those sent from other UEs under the coverage of the base station, are needed for PCell and SCell or more SCells. Note that, serving cells having uplink to which the same timing alignment applies are grouped in a timing alignment group (TAG). Each timing alignment group contains at least one serving cell with configured UL, and the mapping of each serving cell to a timing alignment group is configured by the serving eNB. To obtain initial UL time alignment for a SCell not group together with the PCell, a random access (RA) procedure is used. When the RA procedure on the SCell is performed, the UE needs to monitor PDCCH to receive message 2 of the RA procedure (i.e. random access response) and/or message 4 (i.e. contention resolution).

However, there is no guideline of how to handle the RA procedure if the SCell is deactivated during the RA procedure. For example, if a SCell is deactivated, the UE may not monitor the PDCCH on the SCell or for the SCell. According to the current 3GPP specification, the UE may perform power ramping, and retransmits message 1 (i.e. random access preamble) again and again.

SUMMARY OF THE INVENTION

The application discloses a method of handling random access procedure associated to cell deactivation in a wireless communication system to solve the abovementioned problems.

A method of handling random access procedure associated to cell deactivation for a mobile device in a wireless communication system is disclosed. The method comprises activating a secondary cell configured by a network of the wireless communication system, performing a random access procedure for the activated secondary cell, and when the secondary cell is deactivated during the random access procedure, continuously performing the random access procedure.

A method of handling random access procedure on secondary cell for a mobile device in a wireless communication system is disclosed. The method comprises activating a secondary cell configured by a network of the wireless communication system, performing a random access procedure for the activated secondary cell, and when the secondary cell is deactivated during the random access procedure, aborting the random access procedure.

A method of handling random access procedure on secondary cell for a network in a wireless communication system is disclosed. The method comprises configuring a secondary cell for a mobile device of the wireless communication system, and providing a signaling for indicating the priority between a random access procedure and a deactivation of the secondary cell, to the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
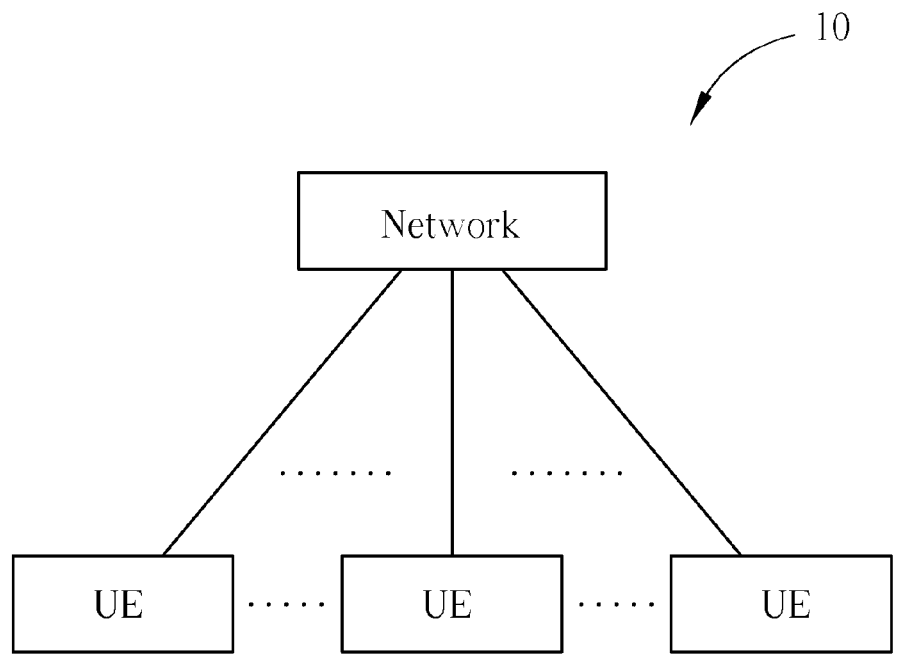
FIG. 1 illustrates a schematic diagram of an exemplary wireless communication system.

Please refer to FIG. 1, which is a schematic diagram of a wireless communication system 10. The wireless communication system 10 is a Long-Term Evolution advanced (LTE-Advanced) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, a camera, a television, a hand-held video game device, a musical device, a wireless sensor, etc. In some applications, a UE may be a fixed computing device operating in a mobile environment, such as a bus, a train, an airplane, a boat, a car, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
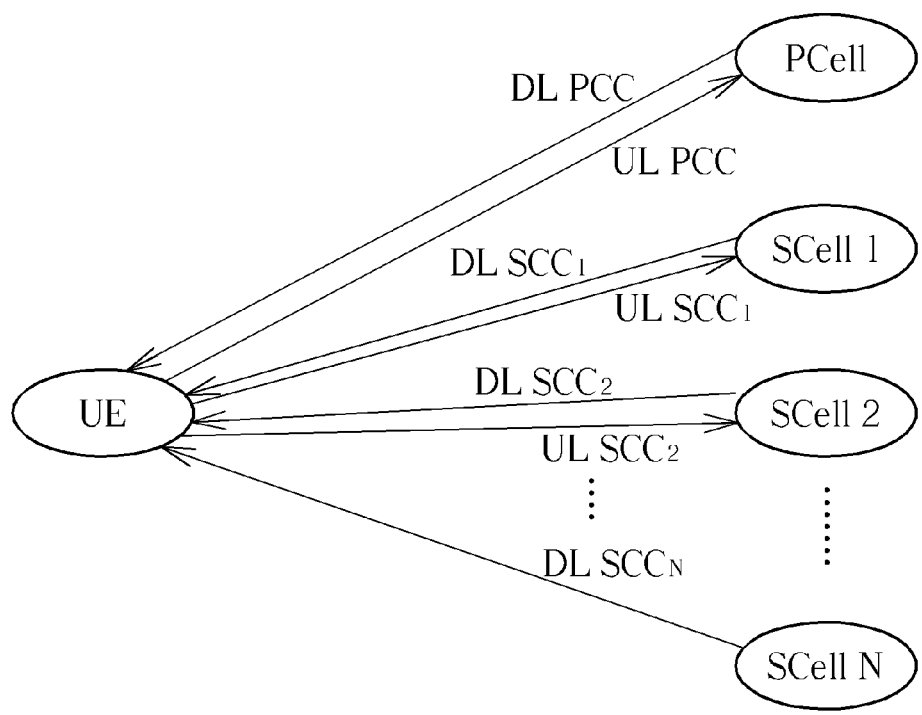
FIG. 2 is a schematic diagram of a user equipment and multiple cells in a wireless communication system in FIG. 1.

Please refer to FIG. 2, which is a schematic diagram of a UE and multiple cells in the wireless communication system 10. The UE communicates with one primary cell (PCell) and several secondary cells (SCells), as SCell 1-SCell N shown in FIG. 2. In the downlink, the component carrier corresponding to the PCell is the downlink primary component carrier (DL PCC) while in the uplink it is the uplink primary component carrier (UL PCC). Depending on UE capabilities, SCells can be configured to form together with the PCell a set of serving cells. In the downlink, the component carrier corresponding to a SCell is a downlink secondary component carrier (DL SCC) while in the uplink it is an uplink secondary component carrier (UL SCC).

Figure 3:
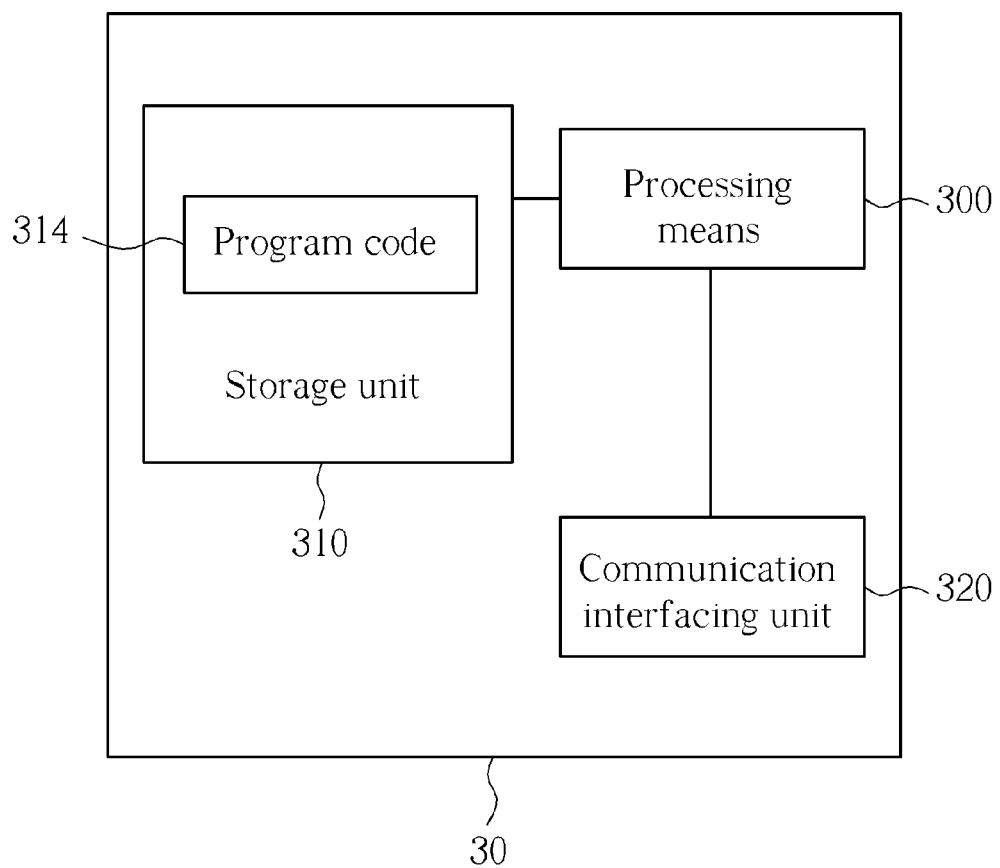
FIG. 3 illustrates a schematic diagram of an exemplary communication device.

FIG. 3 illustrates a schematic diagram of an exemplary communication device 30. The communication device 30 can be the UE shown in FIG. 1, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store program code 314, for access by the processing means 300. Examples of the storage unit 310 include but are not limited to a subscriber identity module (SIM), read-only memory (ROM), flash memory, random-access memory (RAM), CD-ROMs, magnetic tape, hard disk, and optical data storage device. The communication interfacing unit 320 is preferably a radio transceiver and can exchange wireless signals with the network (i.e. PCell or SCell 1-SCell N) according to processing results of the processing means 300.

Figure 4:
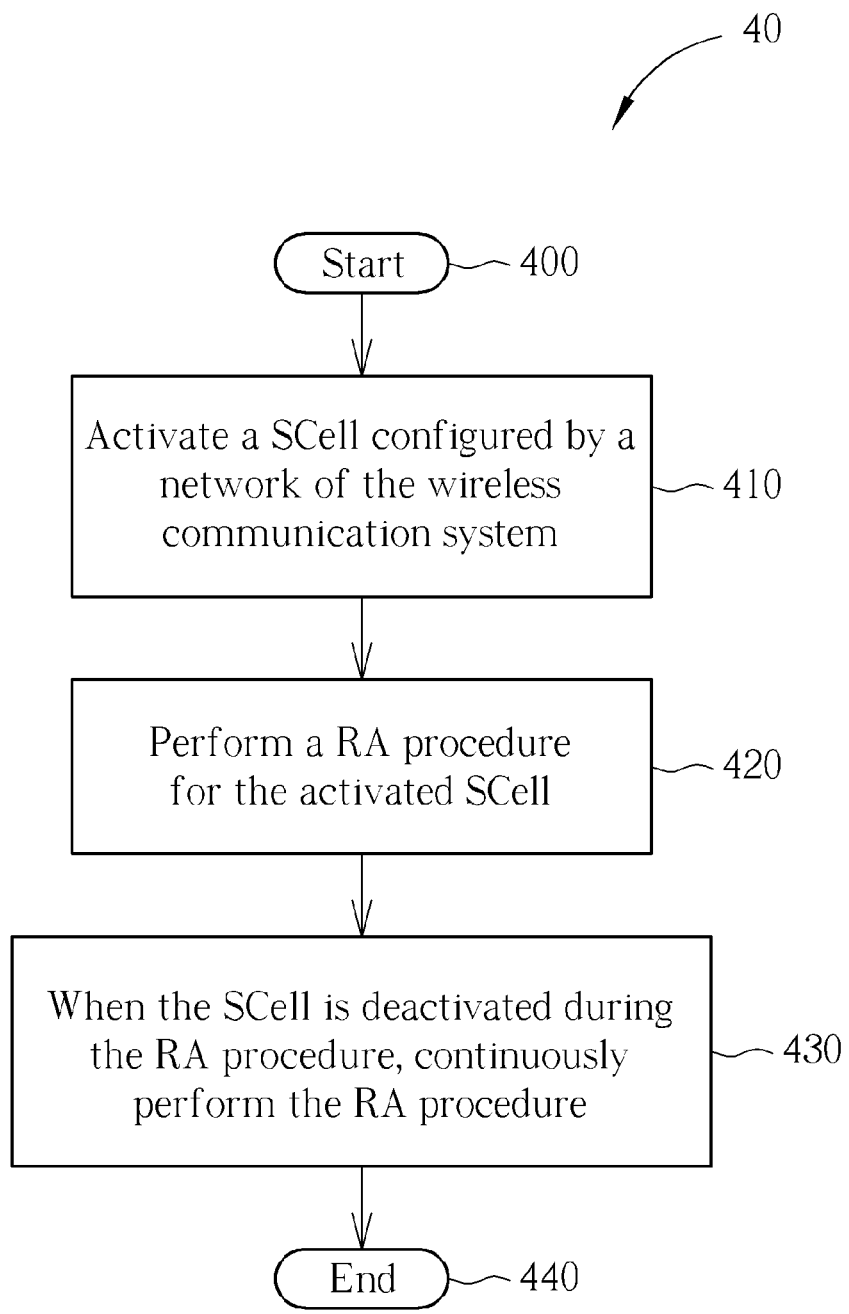
FIG. 4 is a flowchart of an exemplary process.

Please refer to FIG. 4, which illustrates a flowchart of an exemplary process 40. The process 40 is utilized in a UE for handling random access procedure upon SCell deactivation. The process 40 can be compiled into the program code 314 and includes the following steps:

Step 400: Start.

Step 410: Activate a SCell configured by a network of the wireless communication system.

Step 420: Perform a random access procedure for the activated SCell.

Step 430: When the SCell is deactivated during the random access procedure, continuously perform the random access procedure.

Step 440: End.

According to the process 40, when the UE performs the random access procedure for the SCell but the SCell is deactivated during the random access procedure, the UE continuously performs the random access procedure. In this situation, the UE may consider that the random access procedure is prioritized over SCell deactivation.

Figure 5:
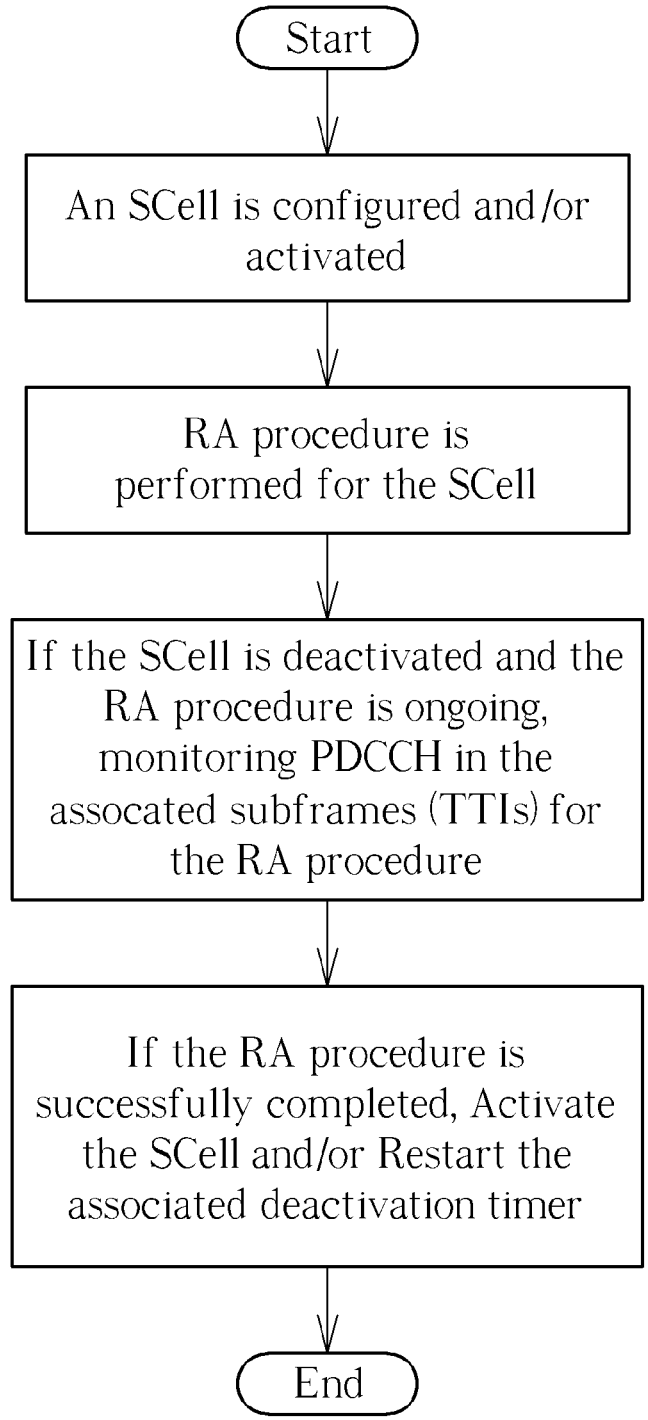
FIG. 5 is a flowchart according to a first embodiment of the present invention.

Take an example based on the process 40. Please refer to FIG. 2 and FIG. 5, which is a flowchart according to an embodiment. A UE is configured with the PCell, and SCell 1-N. When the UE activates the SCell 1, the UE starts a deactivation timer for the SCell 1. In addition, the UE performs a random access procedure for the SCell 1 (or for a timing alignment group (TAG)) for acquiring uplink timing alignment. For example, the UE receives a PDCCH order from the network, which triggers the UE to perform a random access procedure for the SCell 1 (or for a timing alignment group (TAG)), or UE triggers a contention-based random access procedure for the SCell 1 (or for a timing alignment group (TAG)). The UE continuously monitors the physical downlink control channel (PDCCH) in associated subframes for the random access procedure if the SCell 1 is deactivated (e.g., the deactivation timer for the SCell 1 expires during the random access procedure or the UE receives a signaling (e.g., Activation/Deactivation command) for deactivating the SCell 1 from the network during the random access procedure). Note that, the associated subframes may be the subframes the network may send RA message 2 (i.e. random access response) and/or RA message 4 (contention resolution). In addition, the associated subframes may not be on the SCell. For example, the network may send the RA message 2 and/or RA message 4 on the PCell or on the other SCell. Besides, if the random access procedure is successfully completed, the network and/or UE may reactivate the SCell(s) which was deactivated, and restart the associated deactivation timer(s).

In some embodiments, if the SCell 1 on which the random access procedure is performed is deactivated (e.g., the deactivation timer for the SCell 1 expires during the random access procedure or the UE receives a signaling (e.g., MAC Activation/Deactivation command) for deactivating the SCell 1 from the network during the random access procedure), the network and/or UE may continue the random access procedure on the SCell 1. In other embodiments, if the SCell 1 on which the random access procedure is performed is deactivated (e.g., the deactivation timer for the SCell 1 expires during the random access procedure or the UE receives a signaling (e.g., MAC Activation/Deactivation command) for deactivating the SCell 1 from the network during the random access procedure), the network and/or UE may continue the on-going random access procedure or start a new random access procedure on another SCell. For example, the network and/or UE may choose another activated SCell 2 from the same TAG, and perform a random access procedure on the activated SCell 2 for uplink timing adjustment.

Figure 6:
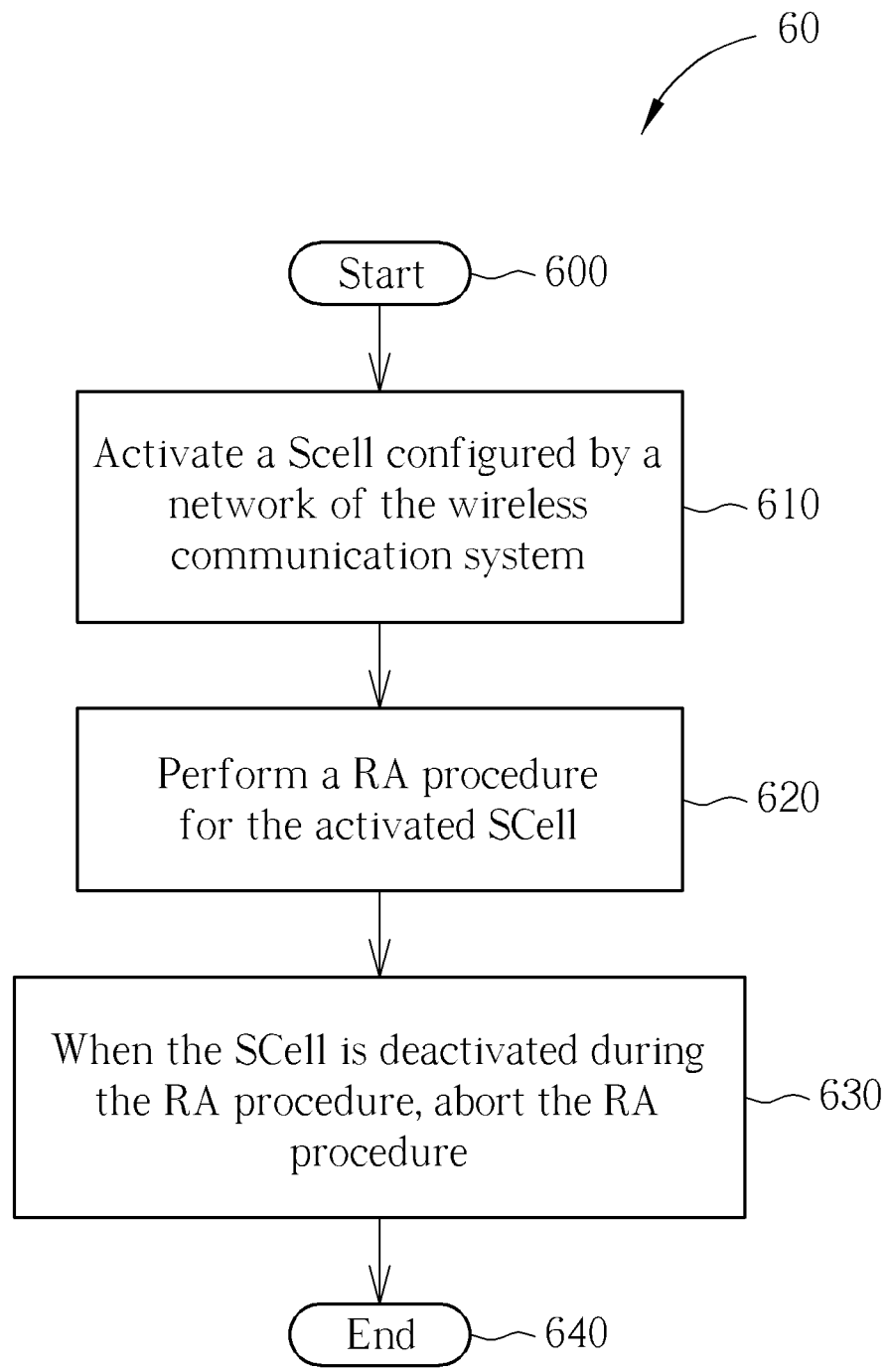
FIG. 6 is a flowchart of an exemplary process.

Please refer to FIG. 6, which illustrates a flowchart of an exemplary process 60. The process 60 is utilized in a UE for handling random access procedure upon SCell deactivation. The process 60 can be compiled into the program code 314 and includes the following steps:

Step 600: Start.

Step 610: Activate a secondary cell configured by a network of the wireless communication system.

Step 620: Perform a random access procedure for the activated secondary cell.

Step 630: When the secondary cell is deactivated during the random access procedure, abort the random access procedure.

Step 640: End.

According to the process 60, when the UE performs the random access procedure for the SCell but the SCell is deactivated during the random access procedure, the UE stops or aborts the ongoing random access procedure. In this situation, the UE may consider that the SCell deactivation is prioritized over the random access procedure.

Figure 7:
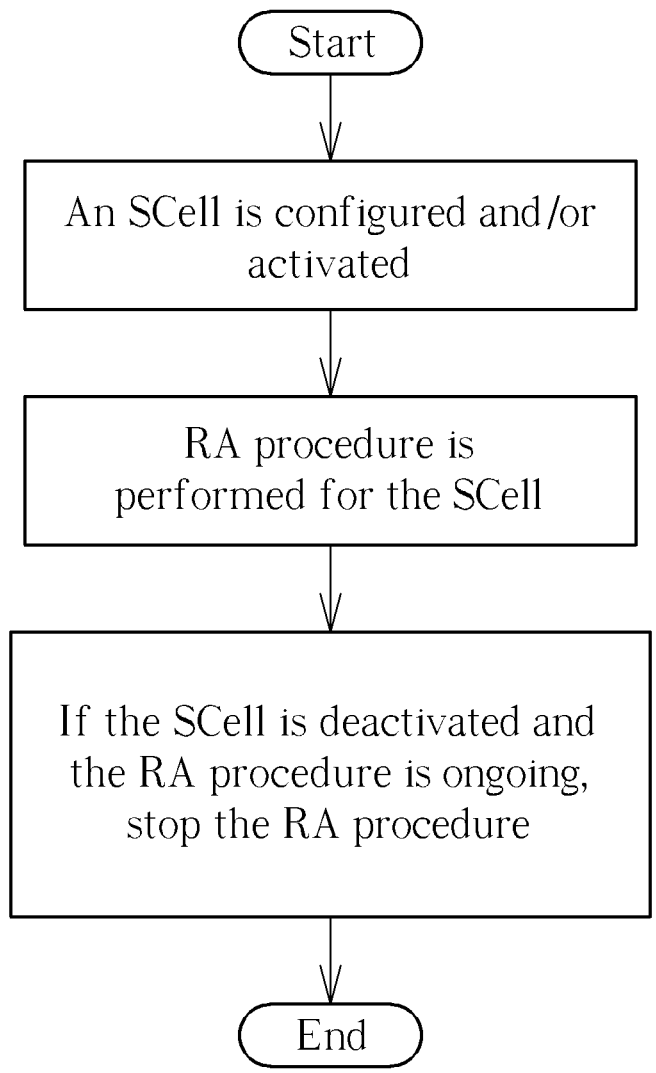
FIG. 7 is a flowchart according to a second embodiment of the present invention.

Take an example based on the process 60. Please refer to FIG. 2 and FIG. 7, which is a flowchart according to an embodiment. A UE is configured with the PCell, and SCell 1-N. When the UE activates the SCell 1, the UE starts a deactivation timer for the SCell 1. In addition, the UE performs a random access procedure for the SCell 1 (or for a timing alignment group (TAG)) for acquiring uplink timing alignment. For example, the UE receives a PDCCH order from the network, which triggers the UE to perform a random access procedure for the SCell 1 (or for a timing alignment group (TAG)), or UE triggers a contention-based random access procedure for the SCell 1 (or for a timing alignment group (TAG)). The UE stops or aborts the random access procedure if the SCell 1 is deactivated (e.g. the deactivation timer for the SCell 1 expires during the random access procedure or the UE receives a signaling (e.g. MAC Activation/Deactivation command) for deactivating the SCell 1 from the network during the random access procedure). As to the stop or abort of the random access procedure, the UE may discard explicitly signalled ra-PreambleIndex which indicates the index of a PRACH within a system frame, and/or ra-PRACH-MaskIndex for indicating subframes which can be transmitted a random access preamble of the random access procedure. In addition, the UE may flush the HARQ buffer used for transmission of the MAC PDU in the message 3 buffer.

Figure 8:
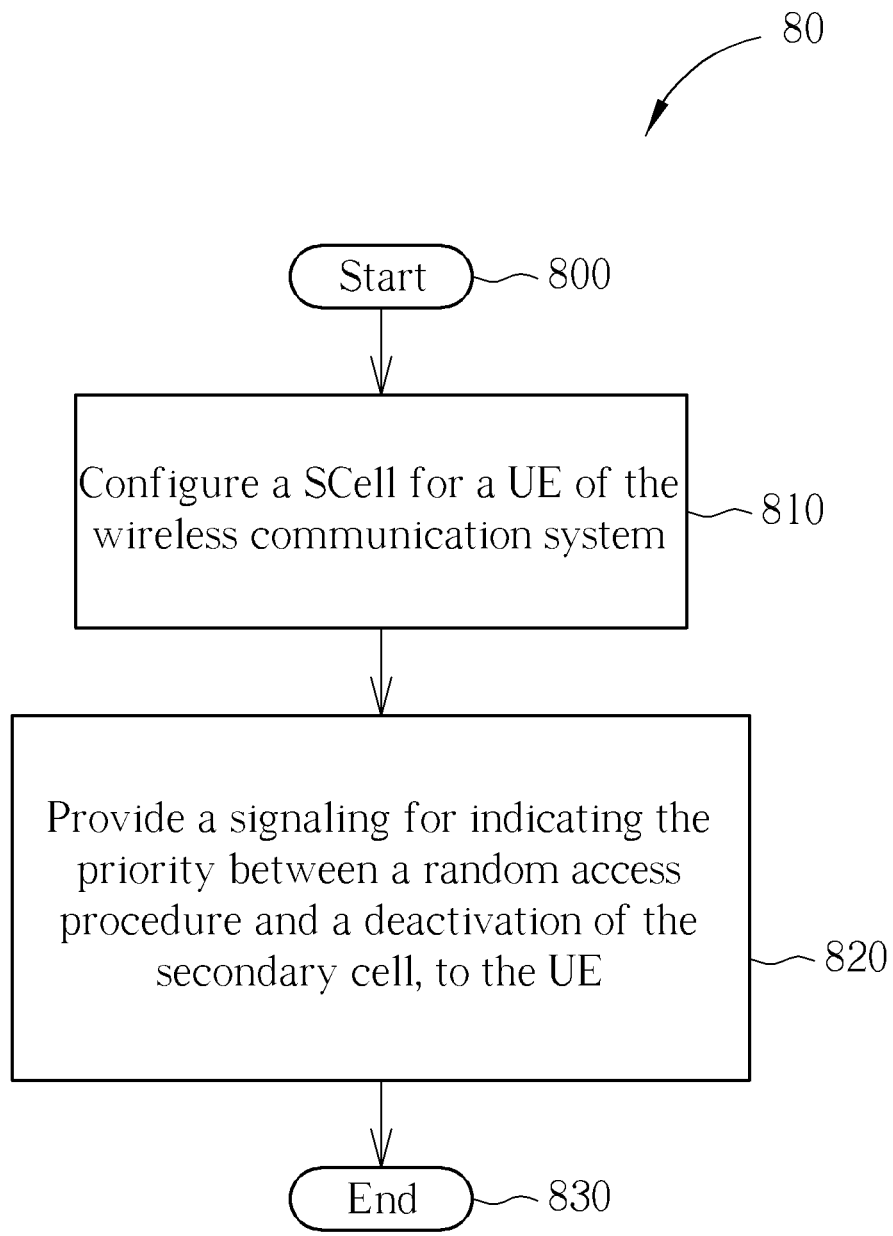
FIG. 8 is a flowchart of an exemplary process.

Please refer to FIG. 8, which illustrates a flowchart of an exemplary process 80. The process 80 is utilized in a network for handling random access procedure on SCell. The process 80 can be compiled into the program code 314 and includes the following steps:

Step 800: Start.

Step 810: Configure a secondary cell for a UE of the wireless communication system.

Step 820: Provide a signaling for indicating the priority between a random access procedure and a deactivation of the secondary cell, to the UE.

Step 830: End.

According to the process 80, the prioritization between the random access procedure and SCell deactivation is determined by the network. In addition, the network transmits a signalling (e.g. by RRC signalling or by PDCCH order) for indicating the prioritization to the UE, so that the UE can determine whether to continuously performs the random access procedure (namely the process 40) or stop/aborts the random access procedure (namely the process 60) according to the prioritization.

Figure 9:
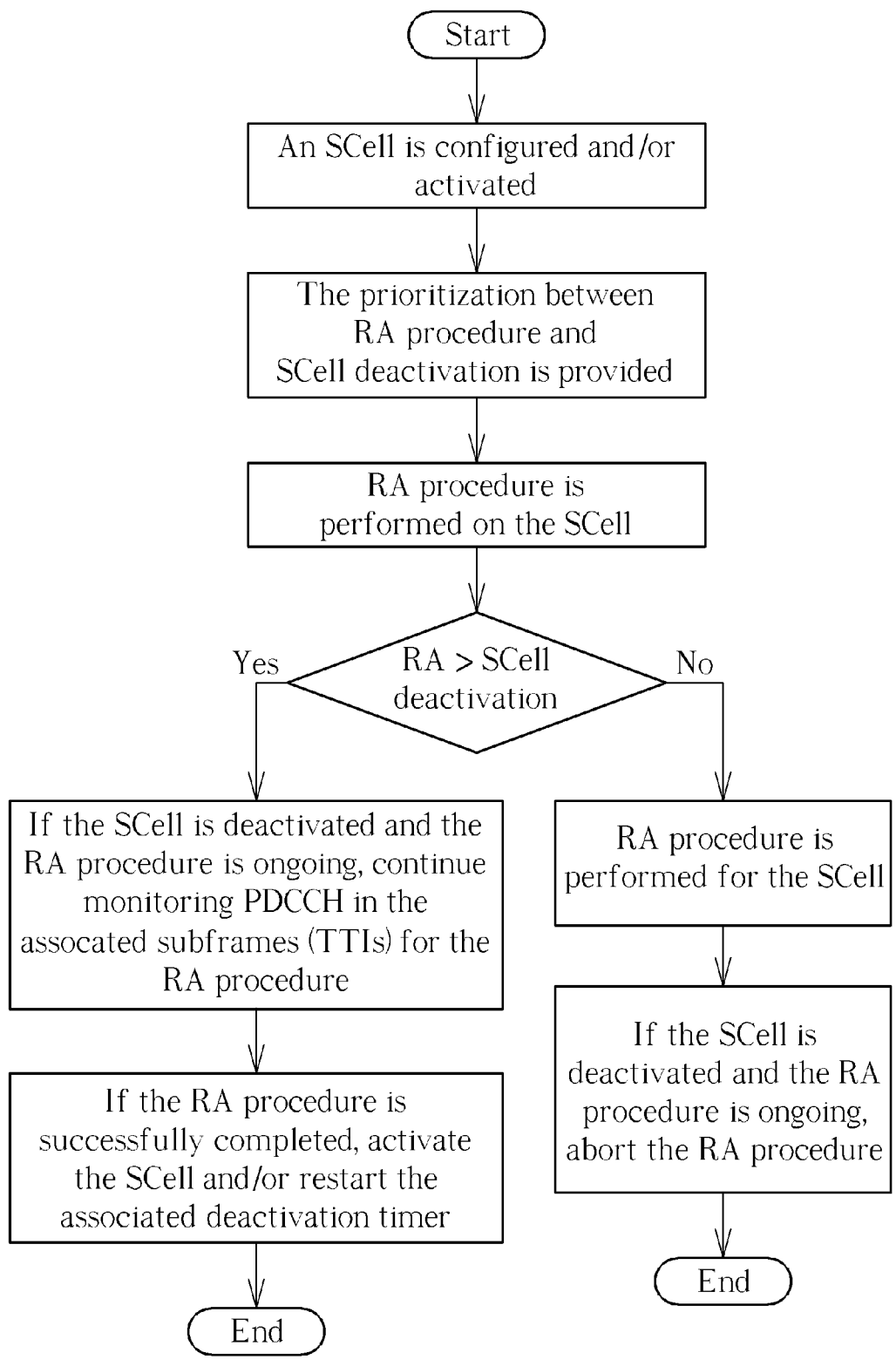
FIG. 9 is a flowchart according to third embodiment of the present invention.

Take an example based on the process 80. Please refer to FIG. 2 and FIG. 9, which is a flowchart according to an embodiment. A UE is configured with the PCell, and SCell 1-N. When the UE activates the SCell 1, the UE starts a deactivation timer for the SCell 1. In addition, the UE performs a random access procedure for the SCell 1 (or for a timing alignment group (TAG)) for acquiring uplink timing alignment. For example, the UE receives a PDCCH order from the network, which triggers the UE to perform a random access procedure for the SCell 1 (or for a timing alignment group (TAG)), or UE triggers a contention-based random access procedure for the SCell 1 (or for a timing alignment group (TAG)). The prioritization between the random access procedure and SCell deactivation may be provided by the network. In some embodiments, the prioritization may be provided by RRC Connection Reconfiguration message or PDCCH order which initiates the random access procedure. If the random access procedure has higher priority than the SCell deactivation, the UE continuously monitors PDCCH in associated subframes (TTIs) for the random access procedure when the SCell 1 is deactivated (e.g. the deactivation timer for the SCell 1 expires during the random access procedure or the UE receives a signaling (e.g. MAC Activation/Deactivation command) for deactivating the SCell from the network during the random access procedure). Moreover, if the random access procedure is successfully completed, the network and/or UE may reactivate the SCell which was deactivated, and/or restart the associated deactivation timer.

On the other hand, if the SCell deactivation has higher priority than the random access procedure, the UE stops or aborts the random access procedure when the SCell 1 is deactivated (e.g. the deactivation timer for the SCell 1 expires during the random access procedure or the UE receives a signaling (e.g. MAC Activation/Deactivation command) for deactivating the SCell 1 from the network during the random access procedure).

In other embodiments, the prioritization between the random access procedure and SCell deactivation may have a default value, and the network may provide a signalling to modify the prioritization. For example, the default prioritization may be that the random access procedure has higher priority than the SCell deactivation. In other words, when the deactivation timer for the SCell 1 expires during the random access procedure, the UE may continuously perform the random access procedure. In some cases, the network may send a signalling to modify the prioritization. For example, if the network sends a signaling (e.g., MAC Activation/Deactivation command) for deactivating the SCell, the signalling may implicitly indicate that the SCell deactivation has a higher priority than the random access procedure. In other words, if the UE receives a signaling (e.g., MAC Activation/Deactivation command) for deactivating the SCell from the network during the random access procedure, the UE deactivates the SCell, and stops or aborts the random access procedure.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides methods for handling random access procedure upon SCell deactivation. The UE keeps the random access procedure running if the SCell deactivation occurs during the random access procedure. Or, the UE stops/aborts the random access procedure if the SCell deactivation occurs during the random access procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access procedure on secondary cell for a network in a wireless communication system, the method comprising:
configuring a secondary cell for a mobile device of the wireless communication system; and
providing a signaling for indicating the priority between a random access procedure and a deactivation of the secondary cell, to the mobile device.

2. The method of claim 1, wherein the signaling is a RRC signaling.

3. The method of claim 1, wherein the signaling is a physical downlink control channel (PDCCH) order which initiates the random access procedure.

4. The method of claim 1, wherein the signaling is an Activation/Deactivation command.

5. A method of handling random access procedure associated to cell deactivation for a mobile device in a wireless communication system, the method comprising:
receiving a signaling for adding a secondary cell configured by a network of the wireless communication system; and
receiving a signaling for indicating the priority between a random access procedure and a deactivation of the secondary cell from the network.

6. The method of claim 5, wherein the signaling is a RRC signaling.

7. The method of claim 5, wherein the signaling is a physical downlink control channel (PDCCH) order which initiates the random access procedure.

8. The method of claim 5, wherein the signaling is an Activation/Deactivation command.

9. The method of claim 5, further comprising:
activating the secondary cell configured by the network of the wireless communication system;
performing the random access procedure for the activated secondary cell; and
determining whether to perform the random access procedure according to the signaling received from the network when the secondary cell is deactivated during the random access procedure.

10. The method of claim 9, wherein determining whether to perform the random access procedure according to the signaling received from the network when the secondary cell is deactivated during the random access procedure comprises:
when the secondary cell is deactivated during the random access procedure and the signaling indicates the random access procedure has higher priority than the deactivation of the secondary cell, continuously performing the random access procedure; and
when the secondary cell is deactivated during the random access procedure and the signaling indicates the deactivation of the secondary cell has higher priority than the random access procedure, aborting the random access procedure.

11. The method of claim 10, wherein when the secondary cell is deactivated during the random access procedure and the signaling indicates the random access procedure has higher priority than the deactivation of the secondary cell, continuously performing the random access procedure comprises:
when the secondary cell is deactivated during the random access procedure and the signaling indicates the random access procedure has higher priority than the deactivation of the secondary cell, continuously monitoring a physical downlink control channel (PDCCH) in associated subframes for the random access procedure.

12. The method of claim 11, wherein the associated subframes is a subframe that the network sends a random access response of the random access procedure and/or contention resolution of the random access procedure.

13. The method of claim 10, further comprising:
reactivating the secondary cell when the random access procedure is successfully completed.

14. The method of claim 10, wherein when the secondary cell is deactivated during the random access procedure and the signaling indicates the deactivation of the secondary cell has higher priority than the random access procedure, aborting the random access procedure comprises: discarding explicitly signaled random access preamble index and/or random access physical random access channel mask index for indicating subframes which can be transmitted a random access preamble of the random access procedure.

15. The method of claim 10, wherein when the secondary cell is deactivated during the random access procedure and the signaling indicates the deactivation of the secondary cell has higher priority than the random access procedure, aborting the random access procedure comprises:
flushing a Hybrid Automatic Repeat Request (HARQ) buffer used for transmission of the MAC PDU in the message 3 buffer.

16. The method of claim 9, wherein the secondary cell is deactivated during the random access procedure due to a deactivation timer for the secondary cell expires during the random access procedure.

17. The method of claim 9, wherein the secondary cell is deactivated during the random access procedure due to a signaling for deactivating the secondary cell is received from the network during the random access procedure.

* * * * *